United States Patent
Stojkovic et al.

(10) Patent No.: US 10,703,288 B2
(45) Date of Patent: Jul. 7, 2020

(54) PICKUP TRUCK WITH BATTERY COOLING PACK AND CUSTOMIZABLE STORAGE SPACE IN BOX SIDE

(71) Applicant: FORD GLOBAL TECHNOLOGIES, LLC, Dearborn, MI (US)

(72) Inventors: Dragan B. Stojkovic, Taylor, MI (US); Colleen Marie Hoffman, Canton, MI (US); Jack Marchlewski, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 20 days.

(21) Appl. No.: 16/156,886

(22) Filed: Oct. 10, 2018

(65) Prior Publication Data

US 2020/0114826 A1   Apr. 16, 2020

(51) Int. Cl.
| | |
|---|---|
| *B60R 5/04* | (2006.01) |
| *B62D 33/037* | (2006.01) |
| *H01M 10/613* | (2014.01) |
| *H01M 10/625* | (2014.01) |
| *H01M 10/6568* | (2014.01) |
| *B60R 5/00* | (2006.01) |
| *B62D 33/03* | (2006.01) |
| *B60K 1/00* | (2006.01) |
| *B60L 58/26* | (2019.01) |

(52) U.S. Cl.
CPC ............... *B60R 5/04* (2013.01); *B60R 5/006* (2013.01); *B62D 33/03* (2013.01); *B62D 33/037* (2013.01); *H01M 10/613* (2015.04); *H01M 10/625* (2015.04); *H01M 10/6568* (2015.04); *B60K 1/00* (2013.01); *B60K 2001/005* (2013.01); *B60L 58/26* (2019.02); *H01M 2220/20* (2013.01)

(58) Field of Classification Search
CPC ........ B60R 5/04; B60R 5/006; H01M 10/625; H01M 10/6568; H01M 10/613; H01M 2220/20; B62D 33/03; B62D 33/037; B60L 58/26; B60K 2001/005; B60K 1/00
USPC ........................................................ 296/37.6
See application file for complete search history.

(56) References Cited

U.S. PATENT DOCUMENTS

| | | | | |
|---|---|---|---|---|
| 3,708,028 | A * | 1/1973 | Hafer ..................... | B60K 1/04 180/65.1 |
| 5,760,569 | A * | 6/1998 | Chase, Jr. ............... | B60K 1/04 320/104 |
| 6,631,775 | B1 * | 10/2003 | Chaney ................... | B60L 50/66 180/68.5 |
| 7,828,099 | B2 * | 11/2010 | Heckeroth ............... | B60K 1/00 180/68.5 |
| 8,517,131 | B2 * | 8/2013 | Kovach ................ | H01M 2/1083 180/68.5 |
| 9,346,494 | B2 * | 5/2016 | Dieringer ............... | B62D 25/24 |

(Continued)

FOREIGN PATENT DOCUMENTS

| | | |
|---|---|---|
| AU | 2008200543 B2 | 11/2010 |
| GB | 2553541 A | 3/2018 |

*Primary Examiner* — Pinel E Romain
(74) *Attorney, Agent, or Firm* — David Coppiellie; King & Schickli, PLLC

(57) ABSTRACT

A pickup truck includes a box side inner panel, a box side outer panel, a first compartment defined between the box side inner panel and the box side outer panel and a battery cooling pack held in the first compartment. A storage space customization feature may also be provided in the first compartment.

20 Claims, 14 Drawing Sheets

(56) References Cited

U.S. PATENT DOCUMENTS

| | | | |
|---|---|---|---|
| 9,358,895 B2 * | 6/2016 | Avganim | B60K 1/04 |
| 9,566,954 B2 | 2/2017 | Moskowitz | |
| 2008/0006459 A1 * | 1/2008 | Niebuhr | B60K 1/04 180/68.5 |
| 2013/0065099 A1 | 3/2013 | Mishima | |
| 2014/0246259 A1 | 9/2014 | Yamamura et al. | |
| 2016/0294026 A1 | 10/2016 | Tsuchiya et al. | |

* cited by examiner

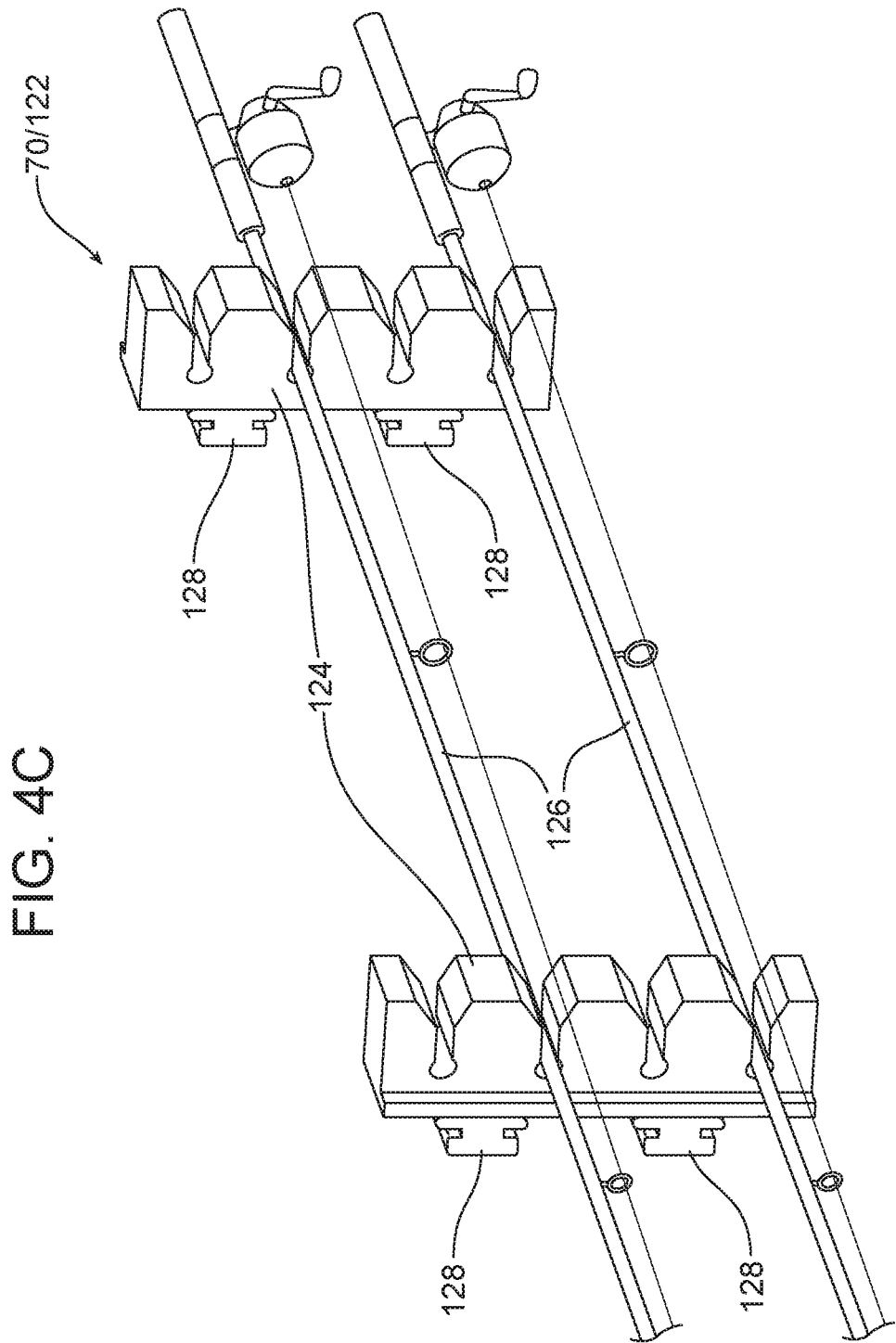

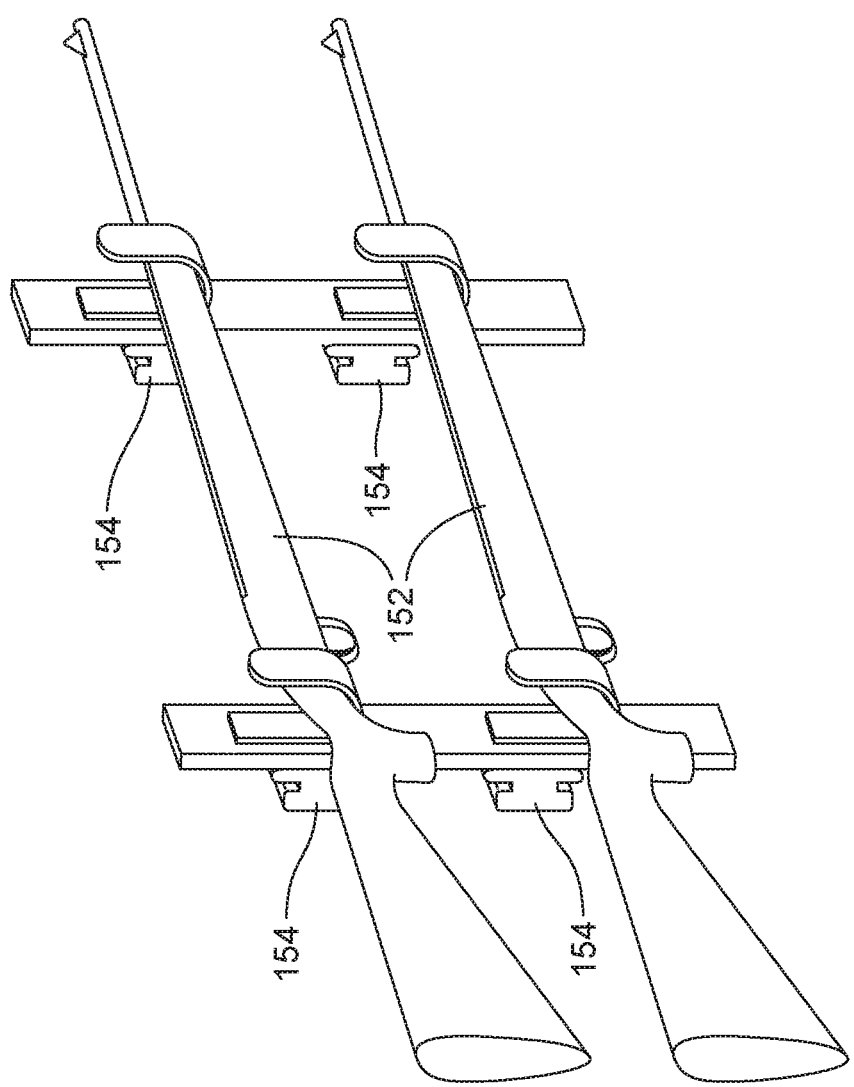

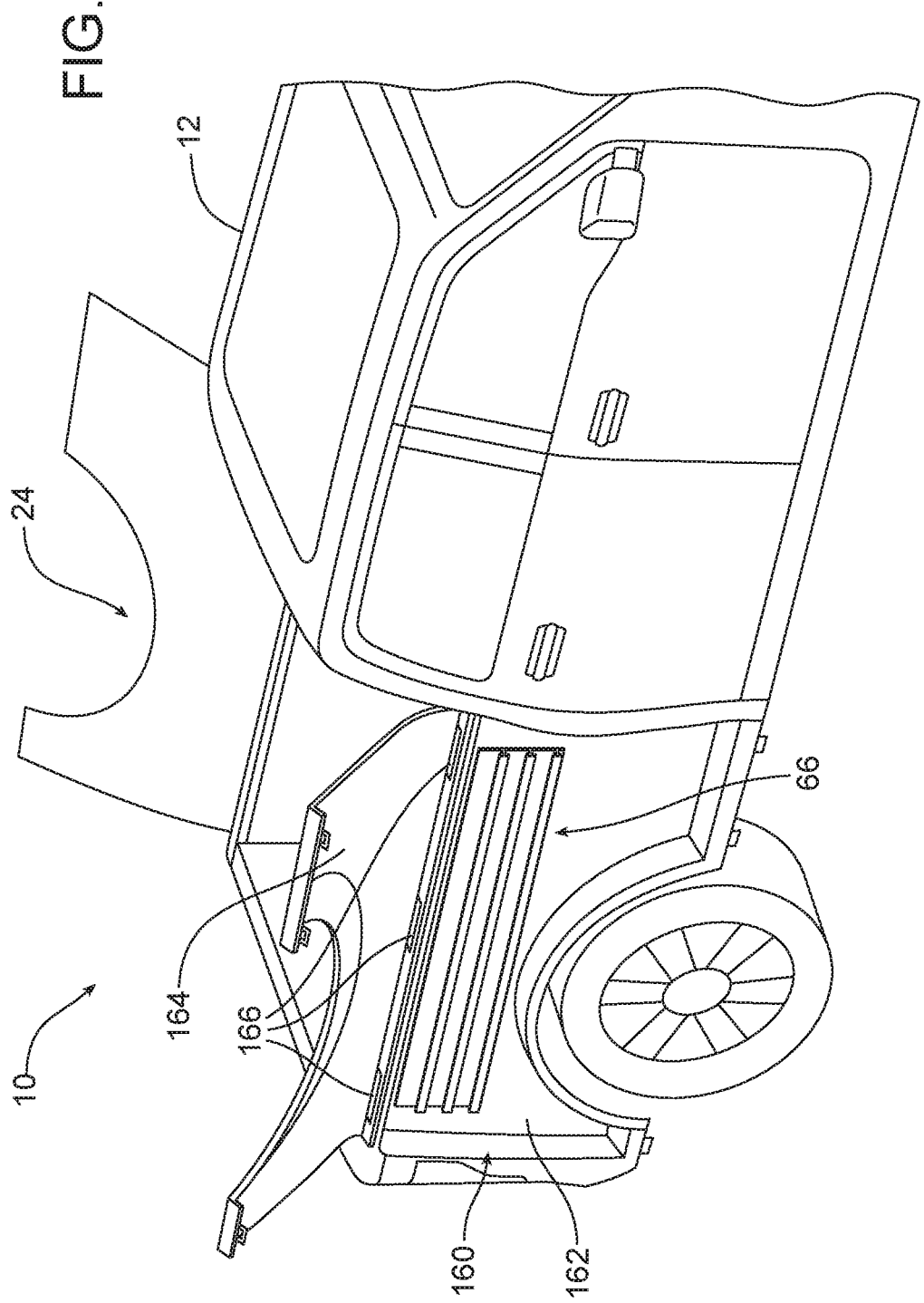

PICKUP TRUCK WITH BATTERY COOLING PACK AND CUSTOMIZABLE STORAGE SPACE IN BOX SIDE

TECHNICAL FIELD

This document relates generally to the motor vehicle equipment field and, more particularly, to a new and improved pickup truck incorporating a battery cooling pack and customizable storage space in one or more box sides of the pickup truck.

BACKGROUND

Battery electric trucks require battery cooling systems which, due their sizing requirements, can only be packaged in the pickup box. In order to limit the loss of cargo space in the box, the cooling system or battery cooling pack is packaged between the box side outer and box side inner panels. In addition, the box side outer panel is designed to function as an access panel to allow generous access for the installation, assembly and service of the battery cooling pack. Further, the compartment defined between the box side inner panel and box side outer panel is adapted as a storage space that may be customized by the motor vehicle operator to neatly and conveniently store any desired items.

SUMMARY

In accordance with the purposes and benefits as described herein, a new and improved pickup truck is provided. That pickup truck comprises a box side inner panel, a box side outer panel, a first compartment defined between the box side inner panel and the box side outer panel and a battery cooling pack held in that first compartment.

A hinge may be provided to connect the box side outer panel to the box side inner panel whereby the box side outer panel may be pivoted between an open position and a closed position. The box side inner panel includes a wheel well. The hinge is provided along a first edge of the box side outer panel. A portion outlining the wheel well extends around a second edge of the box side outer panel opposite the first edge.

The pickup truck further includes a latching feature securing the box side outer panel in the closed position. That latching feature may include a first latch mechanism at a first end of the wheel well, a second latch mechanism at a second end of the wheel well and a third latch mechanism at a front lower corner of the box side inner panel. In addition, the pickup truck may further include a remote latch release carried in a passenger cabin of the pickup truck.

The pickup truck may further include a storage space customization feature in the first compartment. That storage space customization feature may include a plurality of tracks adapted to receive and hold various storage accessories. Those storage accessories may be selected from a group consisting of but not necessarily limited to a storage bin, a plurality of storage bins, a hook, a tie down, a shelf, a gun rack, a ski rack, a fishing pole rack, a utility light, a tool organizer and combinations thereof.

The pickup truck may further include a power distribution outlet in the first compartment.

The battery cooling pack may include a fan and a coolant radiator. In addition, the battery cooling pack may include a coolant input line and a coolant output line for circulating coolant between the battery cooling pack and the battery.

In addition, the pickup truck may further include a second box side inner panel, a second box side outer panel and a second compartment defined between the second box side inner panel and the second box side outer panel at a second side of the pickup truck opposite the first compartment. A second hinge may connect the second box side outer panel to the second box side inner panel whereby the second box side outer panel may be pivoted opened and closed. Further, the storage space customization feature may also be provided in the second compartment.

In the following description, there are shown and described several preferred embodiments of the pickup truck. As it should be realized, the pickup truck is capable of other, different embodiments and its several details are capable of modification in various, obvious aspects all without departing from the pickup truck as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the pickup truck and related method and together with the description serve to explain certain principles thereof.

Figure 4A:
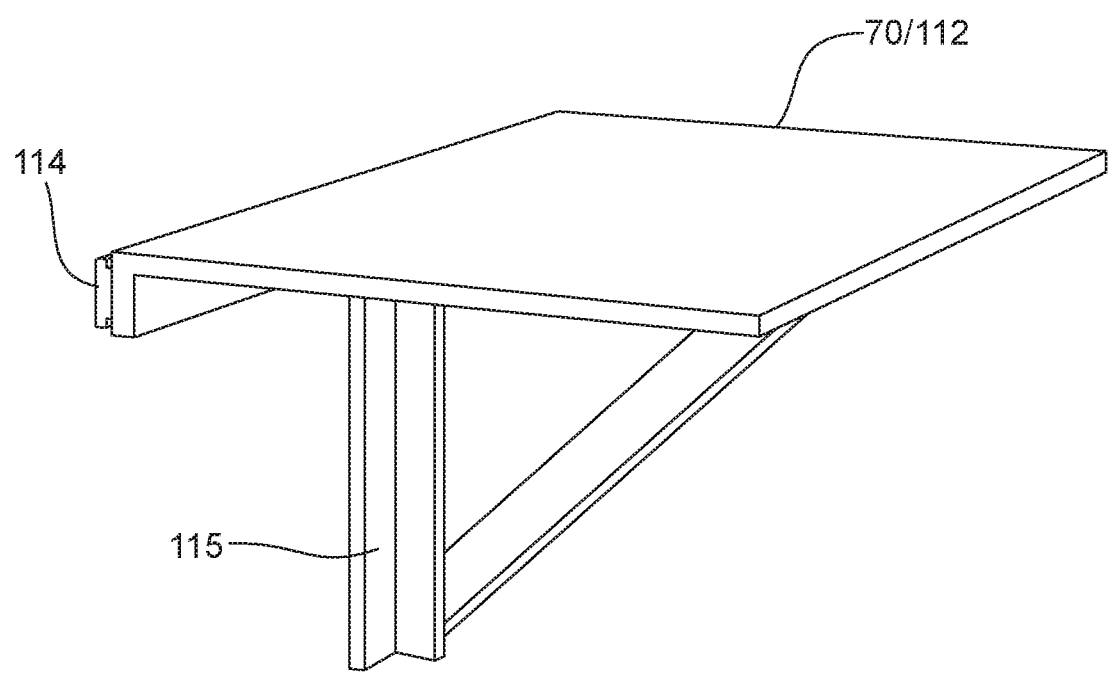
Figure 4B:
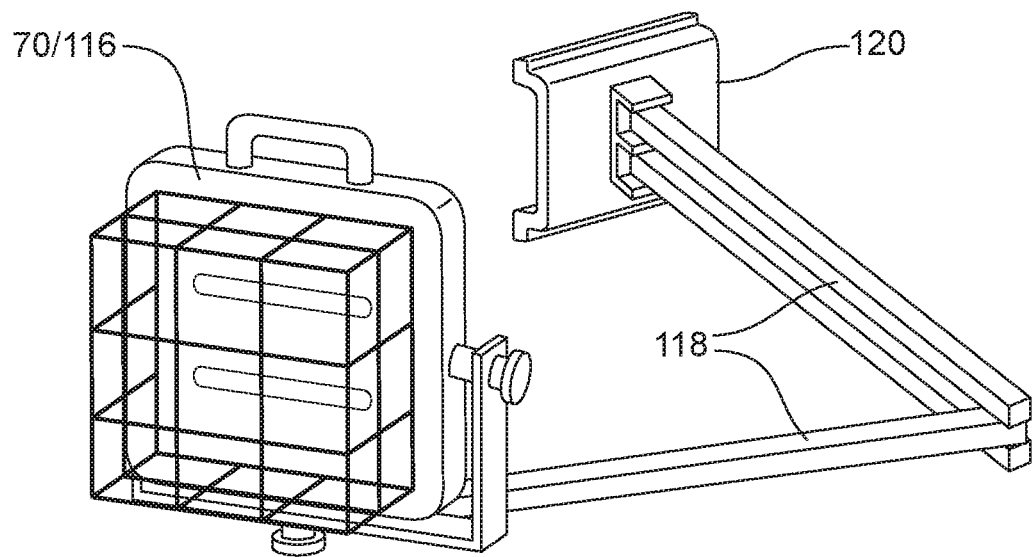
Figure 4D:
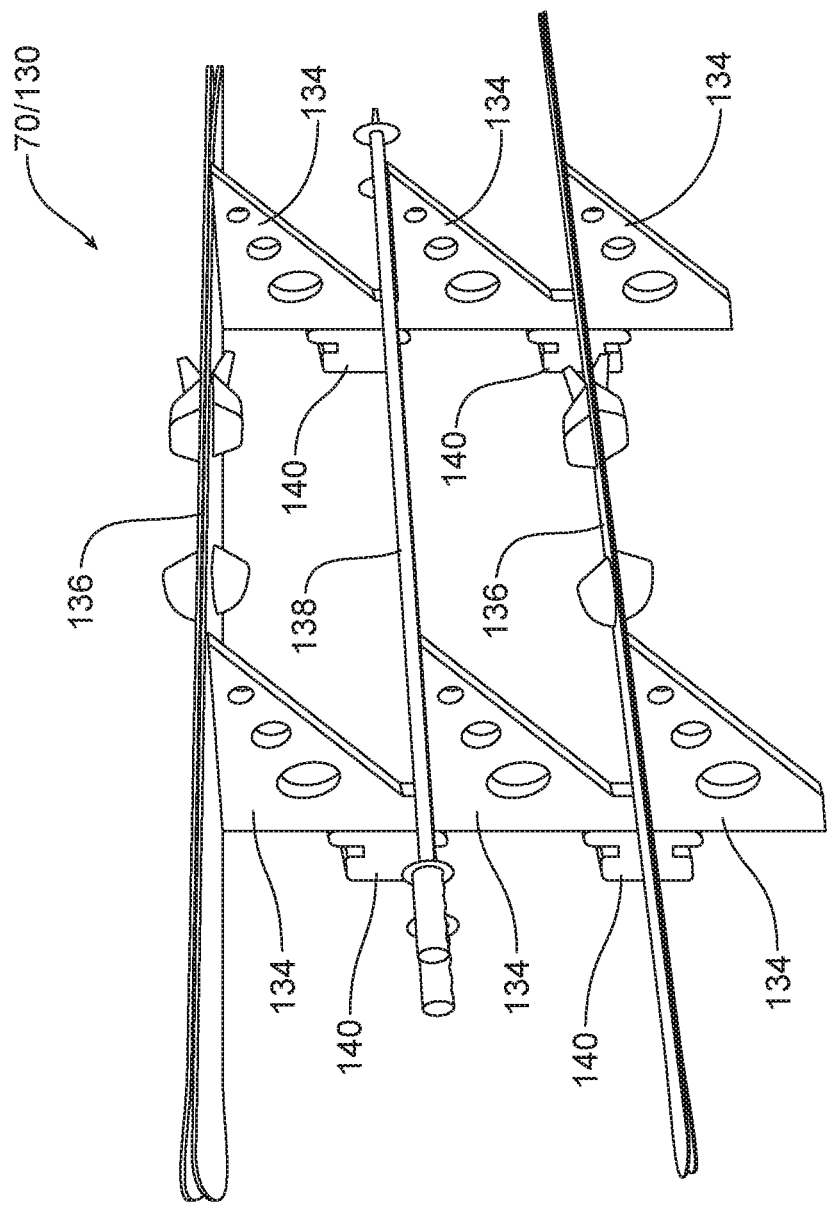
Figure 4E:
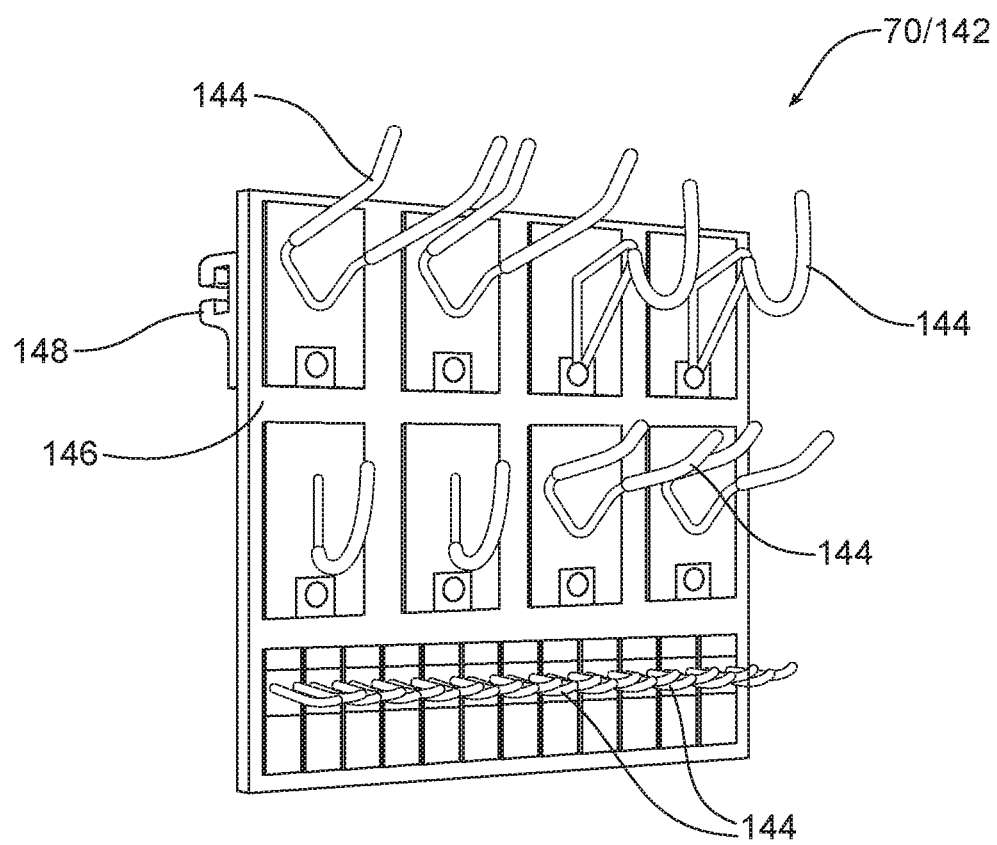

FIGS. 4A-4F illustrate various storage accessories. FIG. 4A is a detailed perspective view of a shelf accessory. FIG. 4B is a detailed perspective view of a utility light accessory. FIG. 4C is a detailed perspective view of a fishing pole rack accessory. FIG. 4D is a detailed perspective view of a ski rack accessory. FIG. 4E is a detailed perspective view of a tool organizer accessory. FIG. 4F is a detailed perspective view of a gun rack accessory.

Figure 5:
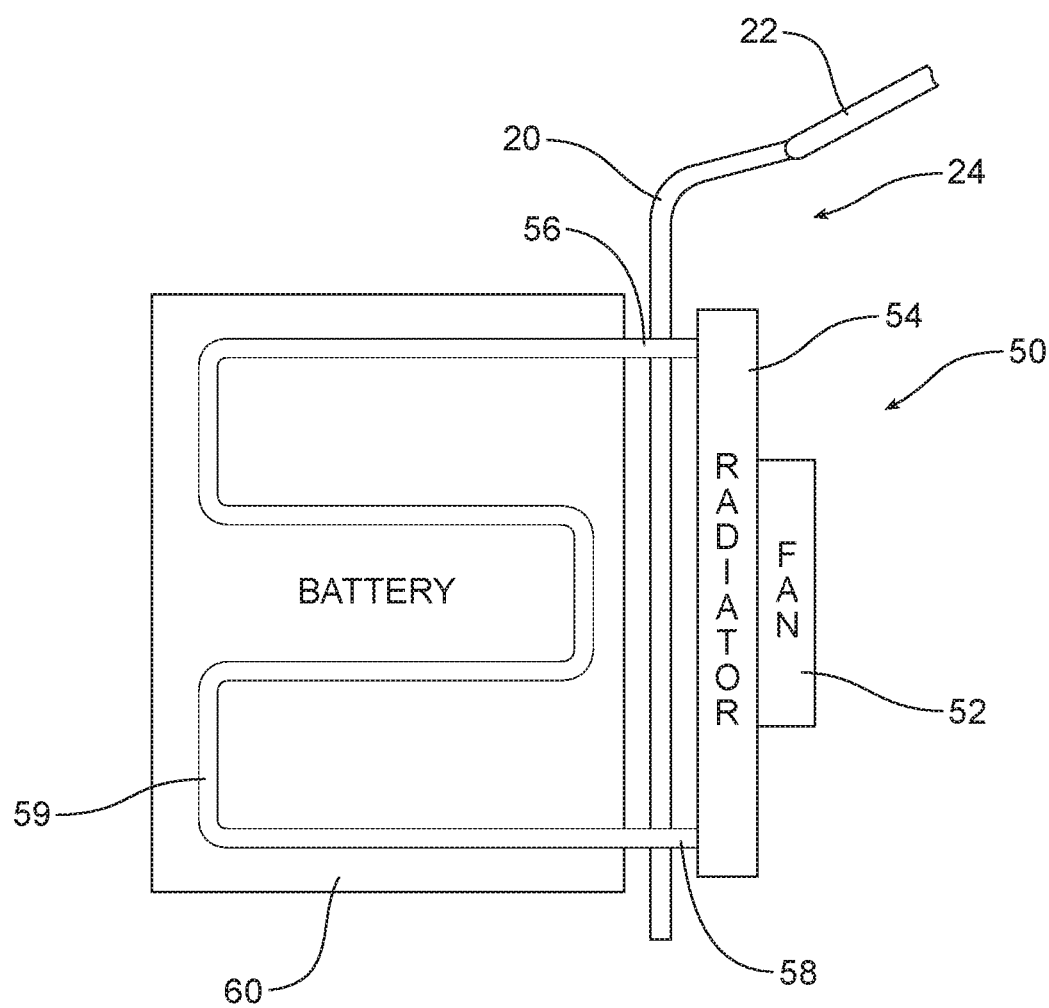

FIG. 5 is a schematic block illustration of the battery cooling pack.

FIG. 6 is a perspective view of a second compartment provided between a second box side inner panel and a second box side outer panel provided on the opposite side of the box of the pickup truck.

Reference will now be made in detail to the present preferred embodiments of the pickup truck, examples of which are illustrated in the accompanying drawing figures.

DETAILED DESCRIPTION

Figure 1A:
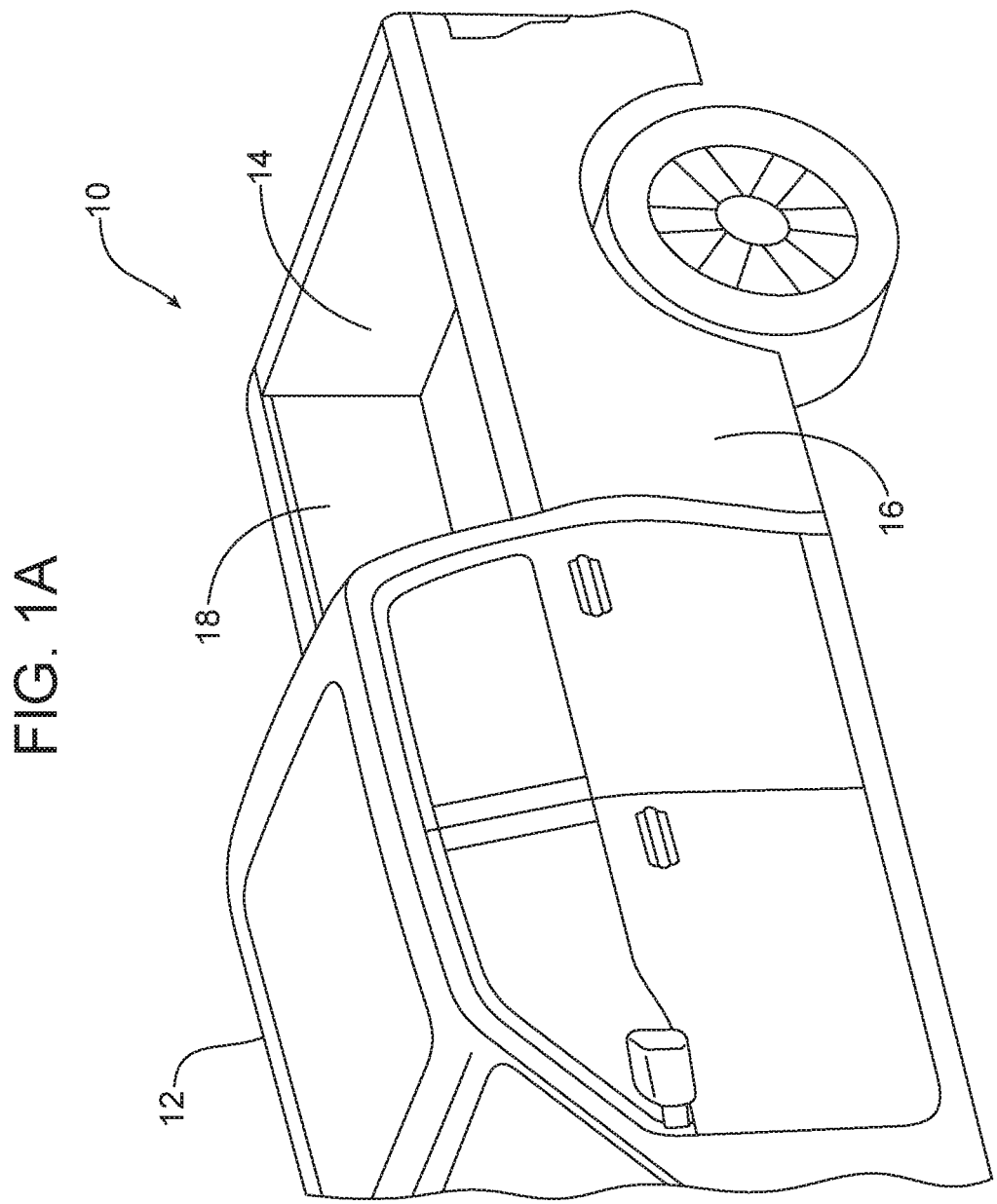
FIG. 1A is a perspective view of the pickup truck illustrating the box side outer panels thereof in the closed position.
Figure 1B:
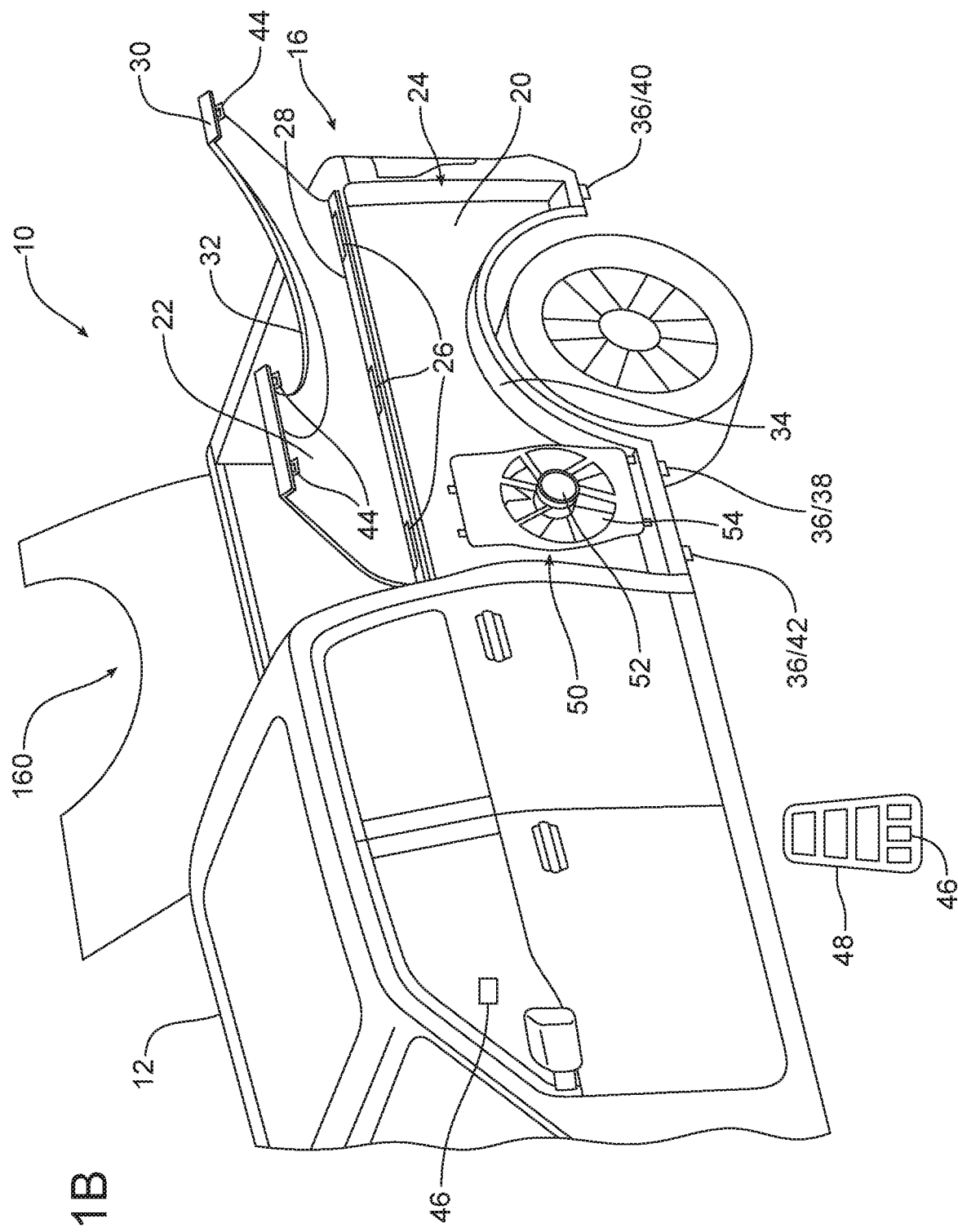
FIG. 1B is a view similar to FIG. 1A but illustrating the box side outer panels in the opened position and further illustrating the battery cooling pack provided in the first compartment.

Reference is now made to FIGS. 1A and 1B which illustrate the pickup truck 10 including a cab 12 and a cargo box 14 defined between two box sidewalls 16, 18. As illustrated box sidewall 16 comprises a box side inner panel 20, a box side outer panel 22 and a first compartment 24 defined between the box side inner panel and the box side outer panel. A hinge 26 connects the box side outer panel 22 to the box side inner panel 20 whereby the box side outer panel may be pivoted between the closed position illustrated in FIG. 1A and the open position illustrated in FIG. 1B which allows full access to the compartment 24.

More particularly, the hinge 26 is provided along an upper or first edge 28 of the box side outer panel 22. The lower or second edge 30, opposite the first edge 28, includes a portion 32 that outlines the wheel well 34 of the box side inner panel 20 when the box side outer panel 22 is in the closed position. A latching feature of a type known in the art and schematically illustrated at 36 secures the box side outer panel in the closed position. More particularly, the latching feature 36 may comprise a first latch mechanism 38 at a first end of the wheel well 34, a second latch mechanism 40 at a second end of the wheel well and a third latch mechanism 42 at a front, lower corner of the box side inner panel 20. The three latch mechanisms 38, 40, 42 engage cooperating staples 44 carried on the box side outer panel 22 in the positions illustrated in FIG. 1B.

A remote latch release 46 may be carried in the cab 12. Of course, it should be appreciated that the remote latch release 46 may also be provided at any other desired location on the pickup truck 10. A remote latch release 46 may also be provided on the key fob 48 associated with the pickup truck 10.

The first compartment 24 may accommodate a wide range of structures and devices. In the embodiment illustrated in FIGS. 1B and 5, the first compartment 24 accommodates a battery cooling pack 50 including a fan 52 and a coolant radiator 54 of a type known in the art. More particularly, the battery cooling pack 50 may include a coolant input line 56 and a coolant output line 58 for circulating coolant between the coolant radiator 54 and the heat exchanger 59 that cools the battery 60 of the pickup truck 10.

Figure 2:
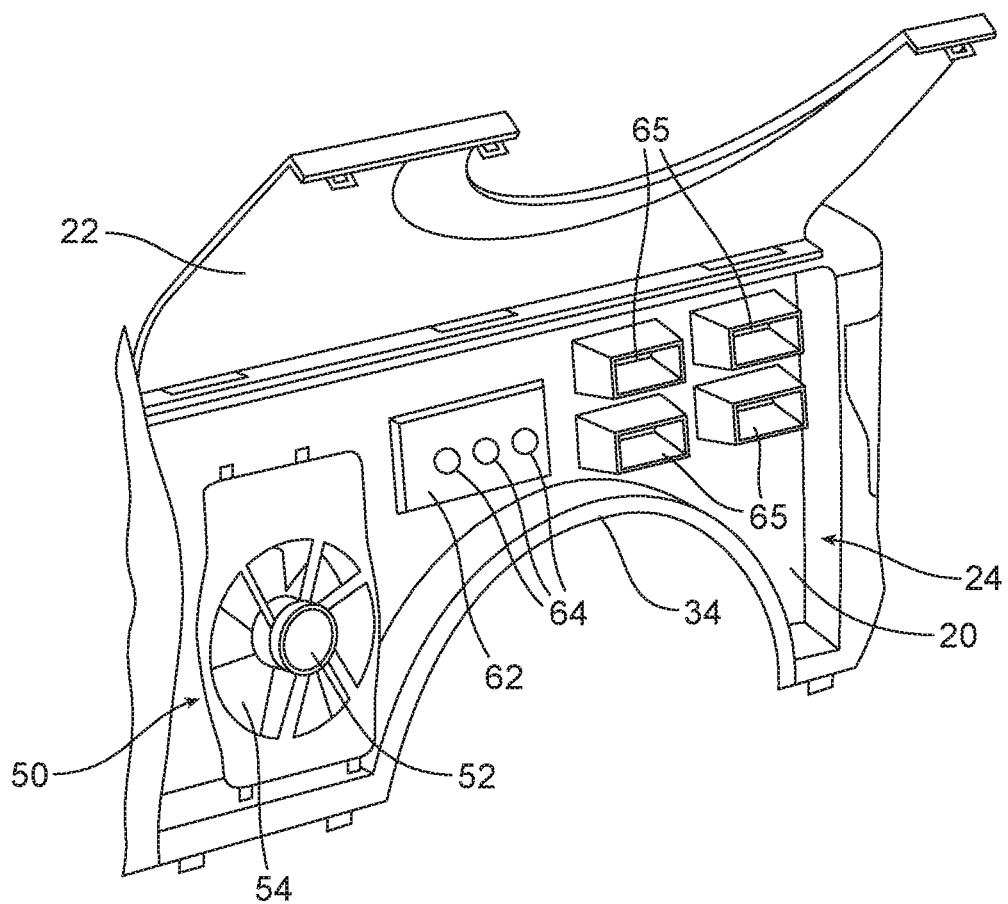
FIG. 2 is a detailed perspective view of one possible customization of the first compartment including a battery cooling pack, a power distribution outlet and four separate storage bins.

In the embodiment illustrated in FIG. 2, the first compartment 24 also accommodates a power distribution outlet 62. In the illustrated embodiment, the power distribution outlet 62 includes three 120 volt inverter outlets 64. Further, the first compartment 24 accommodates a plurality of storage bins 65. Such storage bins 65 may have pivoting lids. Both the lids and sidewalls may be clear to allow one to readily view the contents of each bin.

Figure 3A:
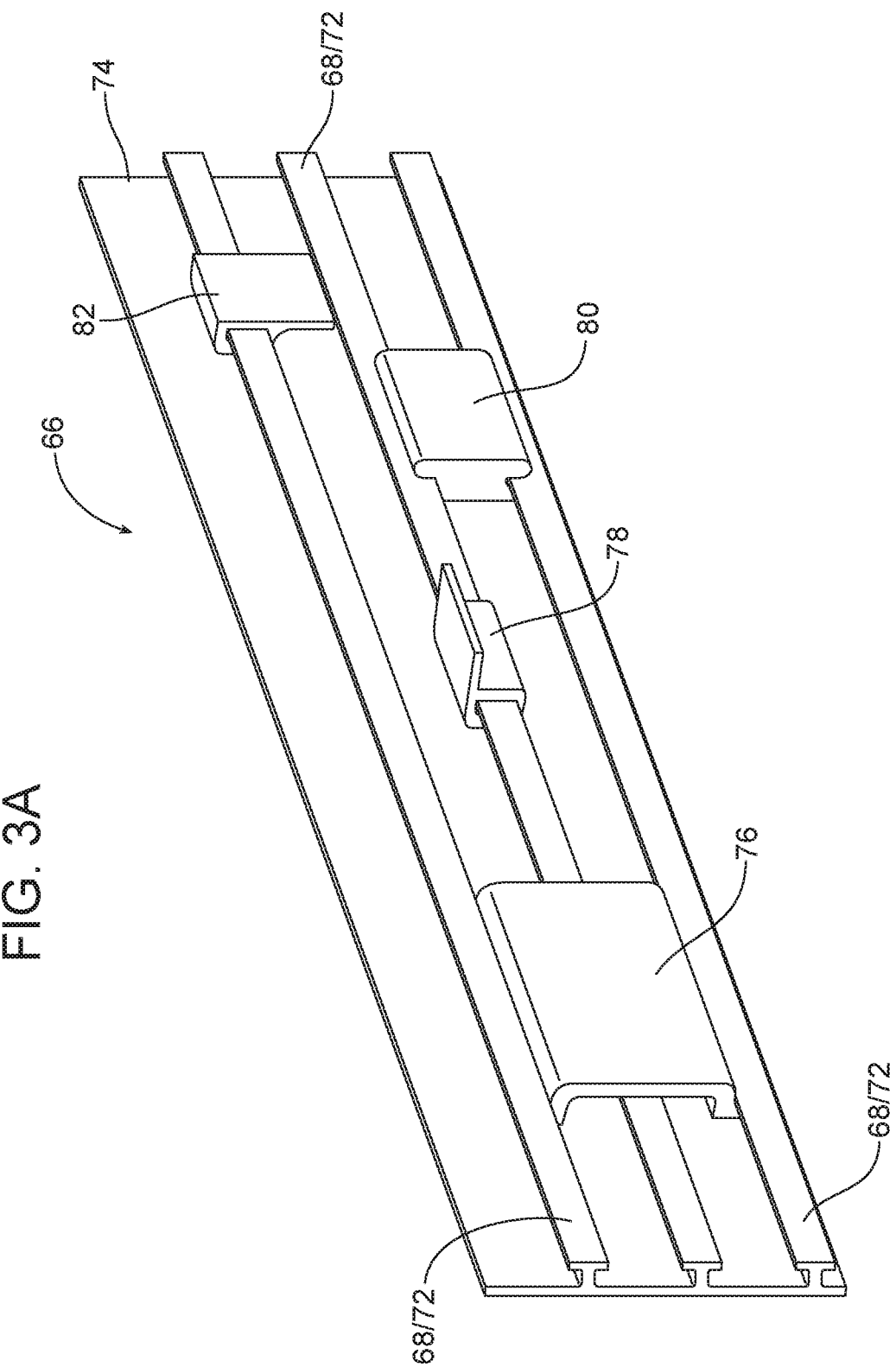
FIG. 3A is a detailed illustration of one possible embodiment wherein a storage space customization feature in the first compartment comprises a plurality of tracks in the form of T-shaped rails.
Figure 3B:
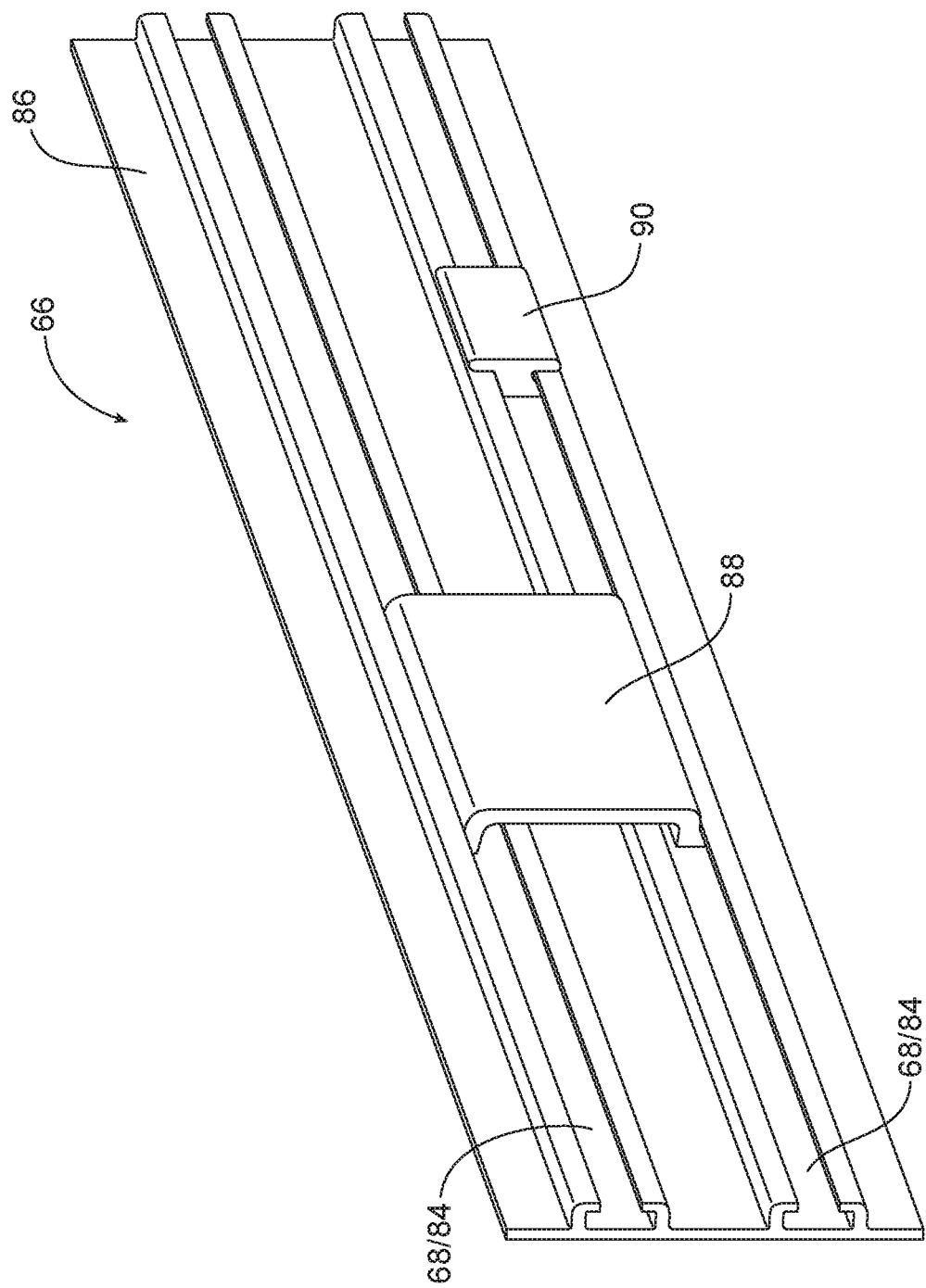
FIG. 3B is a detailed perspective view of an alternative embodiment wherein the storage space customization feature comprises a plurality of tracks in the form of channels.
Figure 3C:
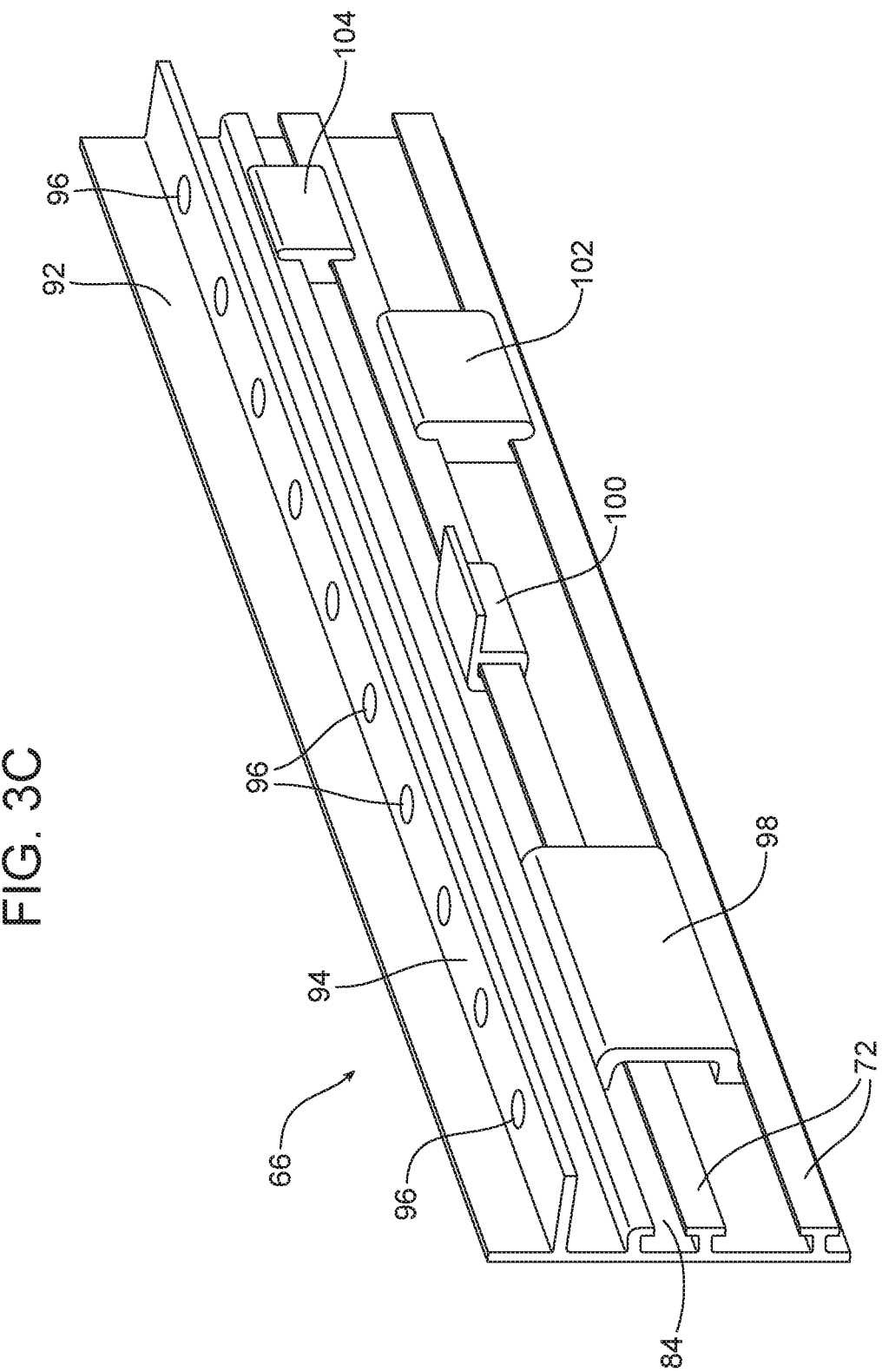
FIG. 3C is a detailed perspective view of yet another alternative embodiment wherein the storage space customization feature comprises a combination of T-shaped rails, channels and a projecting flange incorporating a plurality of apertures.

As illustrated in FIGS. 3A-3C, the first storage compartment 24 may include a storage space customization feature generally designated by reference numeral 66. In the illustrated embodiment, the storage space customization feature 66 comprises a plurality of tracks 68 that receive and hold various storage accessories 70 such as illustrated in FIGS. 4A-4F. The storage tracks 68 may assume a number of forms. As illustrated in FIG. 3A, the storage tracks 68 comprise a plurality of T-shaped rails 72. In FIG. 3A the T-shaped rails 72 are part of an aluminum extrusion 74. Reference numbers 76, 78, 80 and 82 illustrate various bases that may be attached to the T-shaped rails 72 in order to support different storage accessories 70 not shown in FIG. 3A.

FIG. 3B illustrates an alternative embodiment wherein the tracks 68 comprise a plurality of channels 84 which also may be formed as part of aluminum extrusion 86. Reference numbers 88 and 90 illustrate two possible designs for bases adapted to be received and held in the channels 84 to support various storage accessories 70 not shown in FIG. 3B.

FIG. 3C illustrates yet another alternative embodiment of storage space customization feature 66 comprising an aluminum extrusion 92 incorporating two T-shaped rails 72, a channel 84 and a projecting flange 94 including a plurality of spaced apertures 96 adapted to receive and hold tools such as screwdrivers, wrenches or other tools and items. Reference numbers 98, 100, 102 and 104 again illustrate various bases that may be secured to the T-shaped rails 72 and channels 84 and used to support storage accessories 70 not illustrated in FIG. 3C.

In some embodiments, the storage space customization feature 66 is separate from the box side inner panel 20 and is secured to the box side inner panel 20 by an appropriate fastening system of a type known in the art. In other embodiments, the box side inner panel 20 and the storage space customization feature 66 are extruded together to form an integral, one-piece structure thereby eliminating any need for fasteners.

FIG. 4A illustrates a storage accessory 70, in the form of shelf 112, that may be secured by a base 114 to one of the tracks 68. Also note the stabilizing leg 115.

FIG. 4B illustrates an accessory 70 in the form of a utility light 116 supported on an adjustable extension arm 118 by means of a base 120 adapted to engage in one or more of the tracks 68.

FIG. 4C illustrates an accessory 70 in the form of a fishing rod rack 122 comprising two resilient receivers 124 of a type known in the art that are adapted to receive and hold fishing rods 126. Each of the receivers 124 includes a base 128 adapted to engage and secure the receivers 124 to the tracks 68.

FIG. 4D illustrates an accessory 70 in the form of a ski rack 130 comprising a plurality of receivers 134 adapted to receive and hold skis 136 and ski poles 138. Each receiver 134 includes a base 140 adapted to engage and secure the base to one or more of the tracks 68. Ties or clips (not shown) may be used to secure the skis 136 and poles 138 in position on the receivers 134.

FIG. 4E illustrates yet another accessory 70 in the form of a tool organizer 142. That tool organizer 142 includes a plurality of lugs, hooks or tie downs 144 to receive and hold different tools (not shown). The lugs, hooks or tie downs 144 project from a planar support 146 that is secured by bases 148 to the tracks 68.

FIG. 4F illustrates yet another accessory 70 in the form of a gun rack 150 adapted to receive and hold rifles 152. The gun rack 150 is attached to the tracks 68 by cooperating bases 154.

The foregoing has been presented for purposes of illustration and description. It is not intended to be exhaustive or to limit the embodiments to the precise form disclosed. For example, as illustrated in FIGS. 1B and 6, the pickup truck 10 could include a second storage compartment 160 provided between a second box side inner panel 162 and a second box side outer panel 164 at a second side of the pickup truck opposite the first compartment 24. A second hinge 166 may connect the second box side outer panel to the second box side inner panel thereby allowing a second box side outer panel to be pivoted between the opened and closed positions illustrated, respectively, in FIGS. 1B and 1A. A storage space customization feature 66 of the type disclosed and described above may also be provided in the second storage compartment 160. In some embodiments, the second box side inner panel 162 and the storage space customization feature 66 may be an integral, one-piece extruded member.

All such modifications and variations are within the scope of the appended claims when interpreted in accordance with the breadth to which they are fairly, legally and equitably entitled.

What is claimed:

1. A pickup truck, comprising:
   a box side inner panel;
   a box side outer panel;
   a first compartment defined between said box side inner panel and said box side outer panel; and
   a battery cooling pack held in said first compartment.

2. The pickup truck of claim 1, further including a hinge connecting said box side outer panel to said box side inner panel whereby said box side outer panel may be pivoted between an open position and a closed position.

3. The pickup truck of claim 2, wherein said hinge is provided along a first edge of said box side outer panel and a portion outlining a wheel well extends along a second edge of said box side outer panel opposite said first edge.

4. The pickup truck of claim 3, further including a latching feature securing said box side outer panel in said closed position.

5. The pickup truck of claim 4, wherein said latching feature includes a first latch mechanism at a first end of said wheel well, a second latch mechanism at a second end of said wheel well and a third latch mechanism at a front, lower corner of said box side inner panel.

6. The pickup truck of claim 5, further including a remote latch release carried in a cab of said pickup truck.

7. The pickup truck of claim 4, further including a storage space customization feature in said first compartment.

8. The pickup truck of claim 7, wherein said storage space customization feature includes a plurality of tracks adapted to receive and hold accessories.

9. The pickup truck of claim 8, wherein said accessories are selected from a group consisting of a storage bin, a plurality of storage bins, a hook, a tie down, a shelf, a gun rack, a ski rack, a fishing rod rack, a utility light, a tool organizer and combinations thereof.

10. The pickup truck of claim 9, further including a power distribution outlet in said first compartment.

11. The pickup truck of claim 1, further including a power distribution outlet in said first compartment.

12. The pickup truck of claim 1, further including a storage space customization feature in said first compartment.

13. The pickup truck of claim 12, wherein said storage space customization feature includes a plurality of tracks adapted to receive and hold accessories.

14. The pickup truck of claim 13, wherein said accessories are selected from a group consisting of a storage bin, a plurality of storage bins, a hook, a tie down, a shelf, a gun rack, a ski rack, a fishing rod rack, a utility light, a tool organizer and combinations thereof.

15. The pickup truck of claim 3, wherein said battery cooling pack is carried in said first compartment forward of said portion outlining said wheel well.

16. The pickup truck of claim 15, wherein said battery cooling pack includes a fan and a coolant radiator.

17. The pickup truck of claim 1, wherein said battery cooling pack includes a coolant input line and a coolant output line for circulating coolant between said battery cooling pack and a battery.

18. The pickup truck of claim 1, further including a second box side inner panel, a second box side outer panel and a second compartment defined between said second box side inner panel and said second box side outer panel at a second side of said pickup truck opposite said first compartment.

19. The pickup truck of claim 18, further including a second hinge connecting said second box side outer panel to said second box side inner panel whereby said second box side outer panel may be pivoted opened and closed.

20. The pickup truck of claim 19 wherein said storage space customization feature is also provided in said second compartment.

* * * * *